United States Patent [19]

Casperson

[11] 4,438,087
[45] Mar. 20, 1984

[54] CARBON BLACK PROCESS

[75] Inventor: John R. Casperson, Bartlesville, Okla.

[73] Assignee: Phillips Petroleum Company, Bartlesville, Okla.

[21] Appl. No.: 427,248

[22] Filed: Sep. 29, 1982

Related U.S. Application Data

[62] Division of Ser. No. 274,029, Jun. 16, 1981, Pat. No. 4,406,862.

[51] Int. Cl.$^3$ .......................... C01B 31/02; C09C 1/48
[52] U.S. Cl. .................................... 423/450; 423/449; 423/455
[58] Field of Search ...................... 423/450, 455, 449; 422/150, 151, 156, 157

[56] References Cited

U.S. PATENT DOCUMENTS

| | | | |
|---|---|---|---|
| 3,009,784 | 11/1961 | Krejci | 422/151 |
| 3,071,443 | 1/1963 | Bellew | 422/151 X |
| 3,753,658 | 8/1973 | Henderson et al. | 422/150 |
| 3,867,100 | 2/1975 | Cheng | 423/450 |
| 4,071,496 | 1/1978 | Kraus et al. | 423/450 |

*Primary Examiner*—Gregory A. Heller

[57] ABSTRACT

A carbon black reactor having a mixing section and a reaction section with a choke situated within one of these sections further modified by means for reciprocating the choke along the longitudinal axis of the reactor to disrupt flow and, thereby, produce low tint residual carbon black and a method for producing carbon black utilizing the reciprocating choke.

10 Claims, 6 Drawing Figures

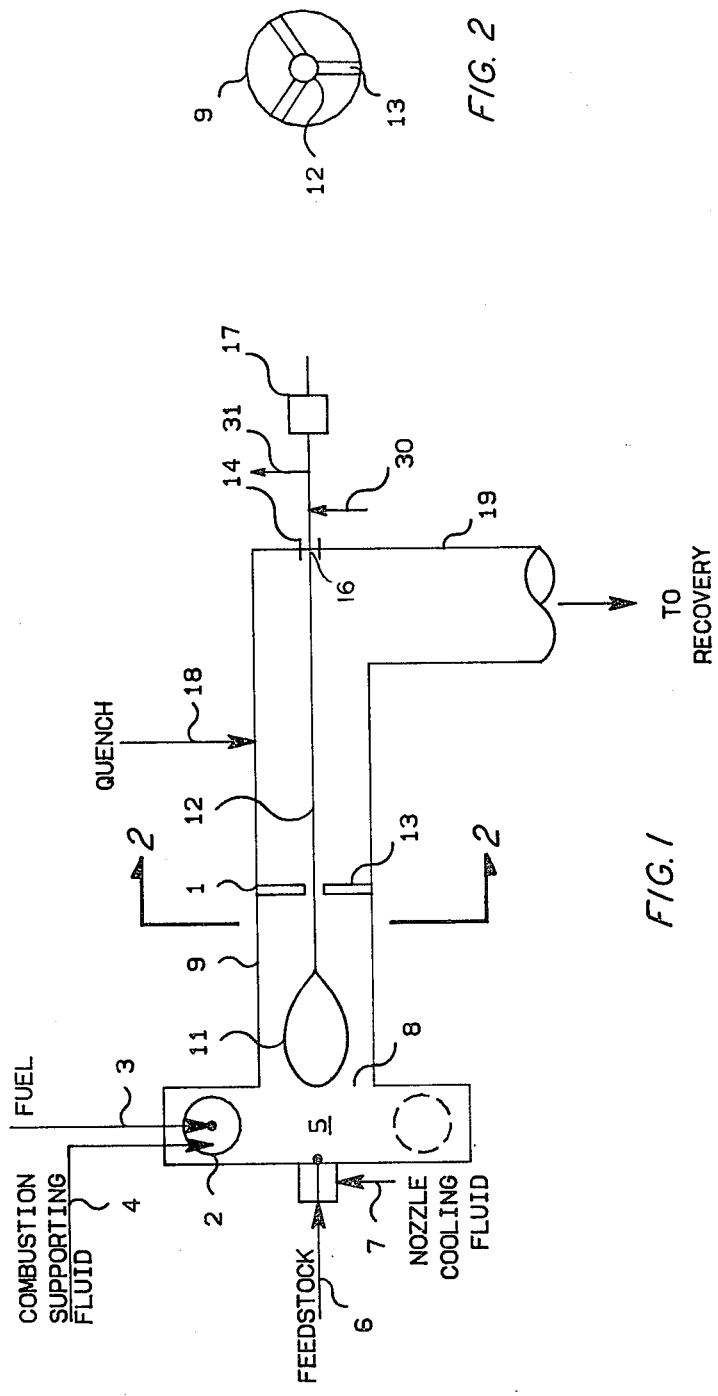

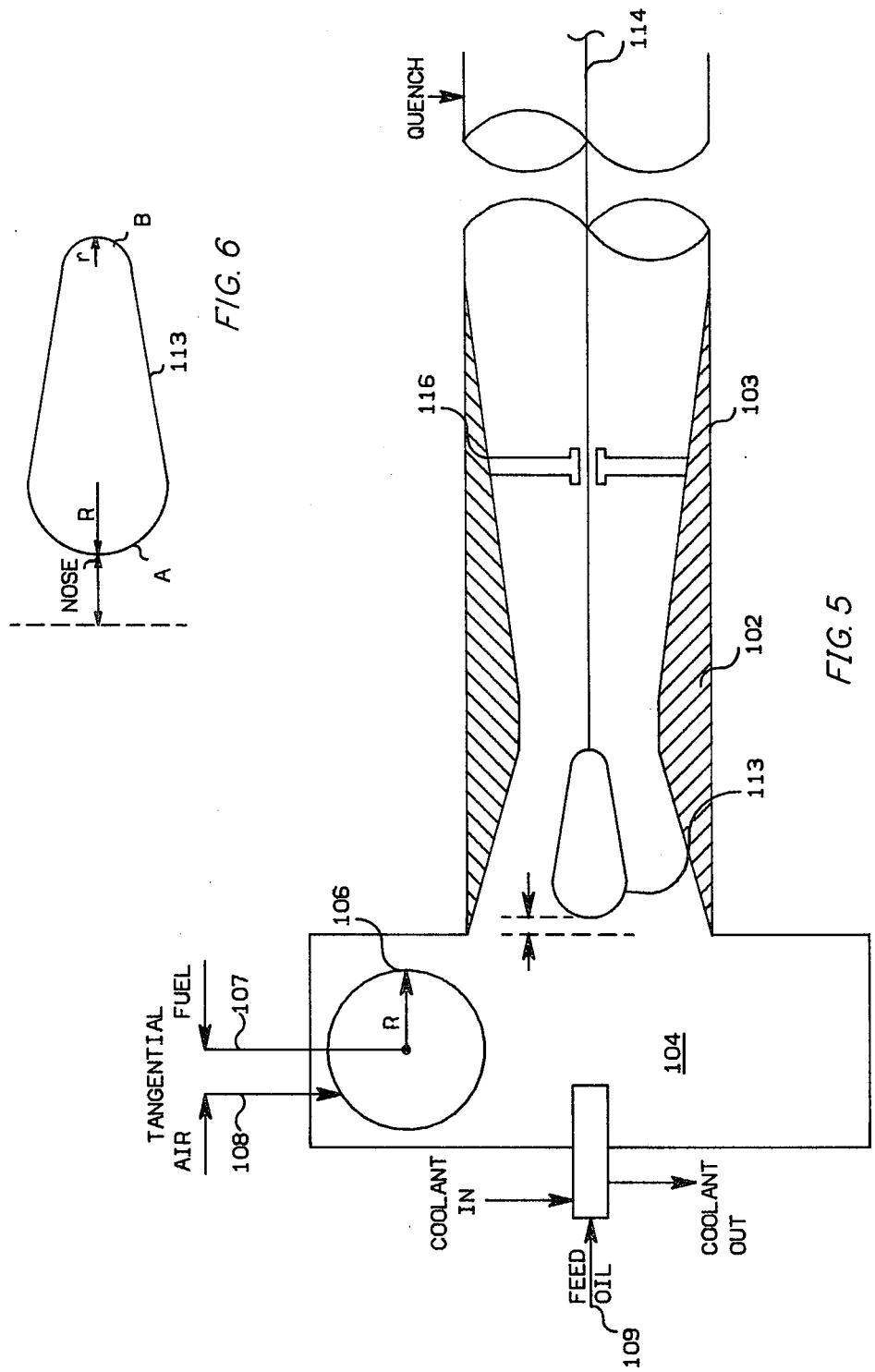

CARBON BLACK PROCESS

This application is a divisional application of my co-pending application, Ser. No. 274,029, filed June 16, 1981 now U.S. Pat. No. 4,406,862.

BACKGROUND OF THE INVENTION

This invention relates to carbon black reactors. In one of its aspects it relates to methods for producing carbon black, In more specific aspects it relates to carbon black reactors having choke means within the reactant flow chambers of the reactors. In another aspect it relates to the production of low tint residual carbon black.

Tint residual (or tint residue) is a property of the carbon black defined by the following formula:

$$TR = T - [56.0 + 1.057\,(CTAB) - 0.002745\,(CTAB)^2 - 0.2596\,(DBP) - 0.201\,(N_2SA - CTAB)]$$

In this formula, the abbreviations used have the following meanings and the properties are measured as described:

TR: This is tint residual.
CTAB: This is the surface area of the carbon black measured in accordance with ASTM D 3765-79, $m^2/gm$.
$N_2SA$: This is the surface area of the carbon black measured using nitrogen in accordance with the ASTM method D-3037-71T, $m^2/gm$.
Compressed DBP: This is the structure of the carbon black in cc/100 g and is measured in accordance with ASTM D 3493-76 This property is also referred to as 24M4 DBP.
T: This is the tint or tinting strength of the carbon black measured relative to the reference black IRB No. 3 which has an arbitrarily assigned value of 100. Tint is measured in accordance with ASTM 3265-75.

Among the carbon blacks defined by the formula given above, those that are further characterized by having surface area and structure properties within the following ranges are particularly preferred:

CTAB: 73 to 140 square meters/gram
Compressed DBP: 67 to 111 cc/100 g
$(N_2SA - CTAB)$: 23 square meters/gram or less All these properties, namely Tint, CTAB, Compressed DBP and $N_2SA$, are defined and measured by ASTM procedures, as disclosed above.

It has been found that carbon black of low tint residual, particularly of tint residual in a range below $-6$, is desirable in the production of rubber compositions used in automobile tires because of low hysteresis, or heat buildup, under road conditions which high abrasion resistance of the compounds is retained. The production of low tint residual carbon black has, therefore, become increasingly important.

Carbon black can be produced by providing reaction conditions under which the flow pattern or the amount of flow of reactants is sufficiently disrupted during a production run to vary the surface area of the product by, among other things, affecting the aggregation of carbon black nodules so that aggregates of varying size result. The present invention provides apparatus and method for producing such a disruption of reactant flow as to effect the production of low tint residual carbon black.

It is, therefore, an object of this invention to provide apparatus and method for producing low tint residual carbon black. It is another object to provide apparatus for reciprocating a choke means within a carbon black reactor.

Other aspects, objects and the various advantages of this invention will become apparent after study of this specification, the drawing, and the appended claims.

STATEMENT OF THE INVENTION

According to this invention an apparatus is provided for producing carbon black in which there is a mixing section with conduit means for introducing reactants; a reaction section downstream of and in open communication with the mixing section; a choke having an aerodynamic configuration; and means for producing movement of the choke along the longitudinal axis of the reactor. In a preferred embodiment a shaft is connected to a "teardrop" shaped choke with the shaft extending through the reactor to connect with a drive means outside of the reactor.

In an embodiment of the invention reactants are introduced under carbon black production conditions into a reactor as described above and the choke is reciprocated or oscillated during operation to disrupt the flow of reactants sufficiently to produce low tint residual carbon black.

In general the carbon black reactors envisioned as useful in this invention are well known in the art. The choke can be similar to that disclosed in U.S. Pat. No. 3,867,100 and is described as of any size in respect to its diameter and of any length, its diameter and position within the reactor being dependent upon the permissible pressure drop with the system and the properties of the carbon black desired. The choke will be supported in any suitable manner and will preferably have a length within the range of from about one to about 3 times the diameter of the reaction section. The length of the minor axis (largest diameter) of the choke will be within the range of about one-third to about four-fifths of the reaction section diameter.

Generally, the annulus between the choke and the reactor wall will have a cross-sectional area of from between about 5 and 150 inches squared, depending on desired reactor throughout, usually between about 12 and about 50 inches squared.

The choke of this invention is preferably of a shape resembling a classically shaped teardrop, that is, the choke has the general configuration of a body recognized as offering the least frictional resistance to the flow of fluids around it under free-fall conditions. For purposes of simplification, it will be designated herein as a "teardrop choke".

The choke here concerned can be positioned in both horizontal and vertically positioned reactors and is particularly beneficial when employed in processes and reactors such as those disclosed in U.S. Pat. No. 2,877,717. Because of the extreme conditions to which the choke is subjected, it will be advantageously fabricated of heat resistant refractories.

The means for oscillation will generally be a shaft, as stated above, extending from the choke and along the longitudinal axis of the flow passage through the reactor, said shaft preferably extending downstream from the choke, through the reactor and reactor wall to a means for reciprocation located outside the reactor.

Generally, the motion imparted to the choke can be interval in nature, however, it is usually a sinusoidal movement for convenience although it is believed that a more uniform distribution in the types of blacks produced can be achieved by moving the choke at a uniform rate of speed, for example, at a linear rate of speed of 2 inches per second.

The shaft and the choke can be hollowed out and cooled on their internal side by means of circulation of heat exchange fluid therethrough and the shaft can contain internal means for reciprocation such as a coaxially mounted shaft although this can unduly increase the size of the shaft. The shaft will, of course, be firmly supported within the reactor as necessary to provide sliding of the shaft along a fixed path. The conditions of reactions are generally sufficiently stringent to require that the internal support be equipped with internal means for cooling by heat exchange fluids. Such means can be similar to those described below for cooling the shaft and choke.

The apparatus and method of this invention can best be understood in conjunction with the drawing in which FIG. 1 is a cutaway view of a reactor with reciprocal choke useful in this invention.

FIG. 2 is a support means.

FIG. 5 is a cut-away view of a reactor with a Venturi section, and FIG. 6 is a cut-away view of a choke of this invention.

Figure 3:
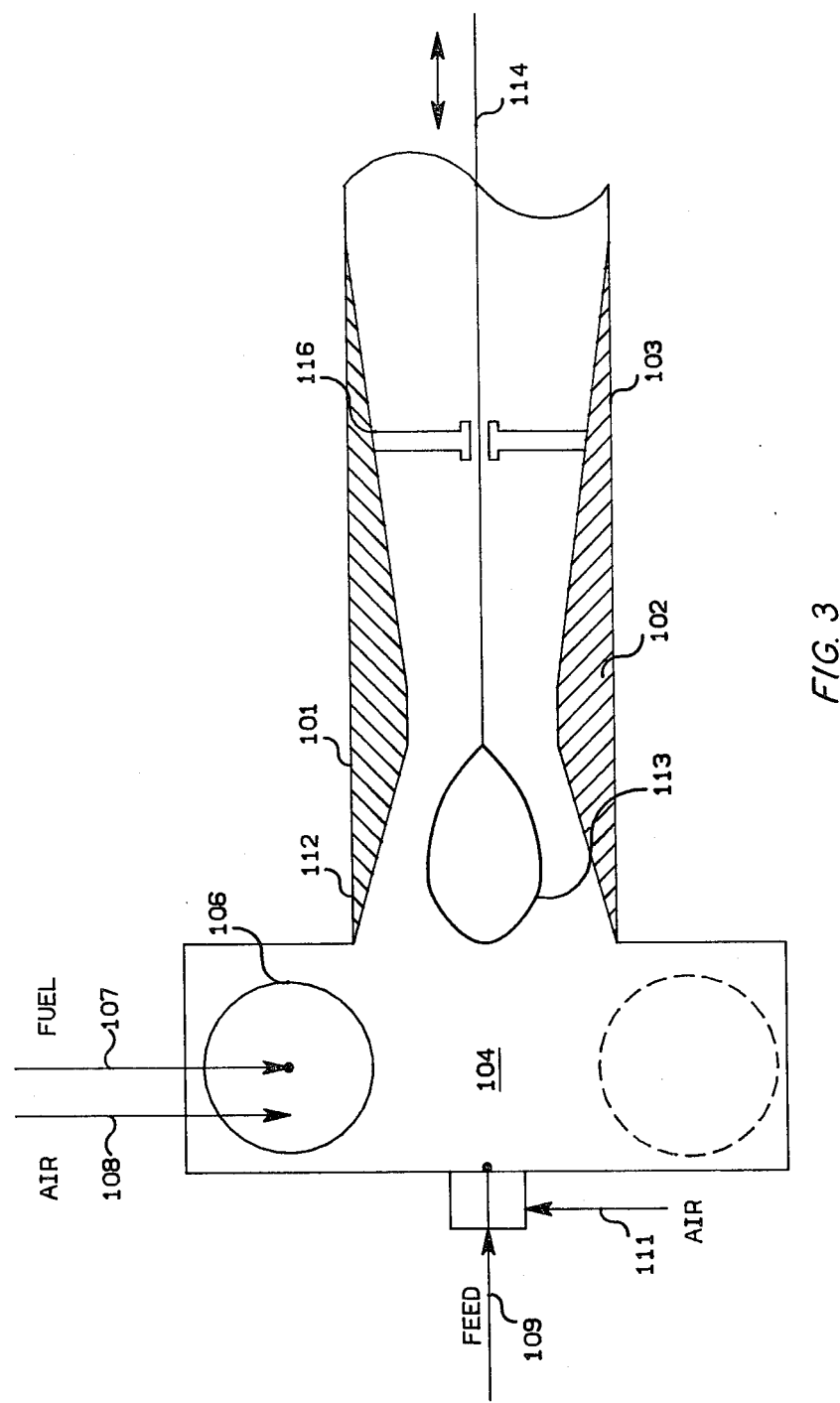
FIG. 3 is a cut-away view of a reactor with Venturi section.

Referring now to the drawing, in FIGS. 1 and 2 there is a vortex flow reactor 1 with the introduction of hot combustion gases tangentially via tangential tunnels 2 to which fuel 3 and combustion supporting gas, e.g. air, 4 are charged. A vortex of hot combustion gases is produced in combustion of precombustion mixing chamber 5. Feedstock, e.g., aromatic oil, 6 is injected axially into this vortex (the oil injection means being cooled by axial air at 7). The reaction mass of feedstock 6 and hot combustion gases added via 2 enters reaction section 8 comprising an annular Venturi section formed between the cylindrical section 9 and the teardrop choke means 11. Means 11 is mounted on axial shaft 12 supported on support means 13 and extends externally from the reactor 1 at 14, using a suitable bushing means or packing gland 16. Typical glands are disclosed in U.S. Pat. No. 3,009,784. The drive means 17 effects desired positioning of choke means 11, and can effect longitudinal oscillation of means 11 at the rate and distance desired within cylinder 9. Generally, the choke 11 is positioned in the cylinder 9 so that the position of greatest restriction relative to the point of feedstock injection is from about 6 to about 120 inches downstream, depending on reactor size, usually from about 12 to about 48 inches downstream. The magnitude of the movement imparted to the choke means 11 is generally from about 3 inches to about 36 inches as measured along the axis of the reactor, preferably between about 6 inches and about 18 inches. Generally, the rate of oscillation is from about 1/1000 to about 100 cycles per second usually, between about 1/10 and 10 cycles per second, and is sufficiently rapid to provide a black, which, after collection, is uniformly heterogenous, and preferably having a tint residual of less than about −6. The carbon black-containing gases are quenched via quench fluid 18 (e.g., water, cooled reactor smoke, and the like) and pass via conduit 19 to recovery (further cooling and carbon black recovery as by a bag filter means, not shown).

FIG. 3 illustrates another embodiment of the invention employing a Venturi type vortex flow carbon black reactor. In FIG. 3, reactor 101 has Venturi 102 positioned in cylindrical reaction section 103. Tangential hot combustion gases enter the combustion or precombustion mixing section 104 via tangential tunnels 106. Fuel 107 and combustion supporting gas, e.g., air, 108 are reacted in tunnels 106, forming a vortex of hot combustion gases in section 104. Feedstock is charged axially into this vortex via 109, and feedstock injection means is cooled by air injection means 111. Positioned within the converging zone 112 of Venturi 102 is a teardrop-shaped choke 113 positioned on axial support rod 114 having rod support means 116. (Not shown is exit end of rod—see FIG. 1). The choke means 113 can be moved axially along the reactor within the converging section 112. The movement is an oscillating movement, as in FIG. 1.

Figure 4:
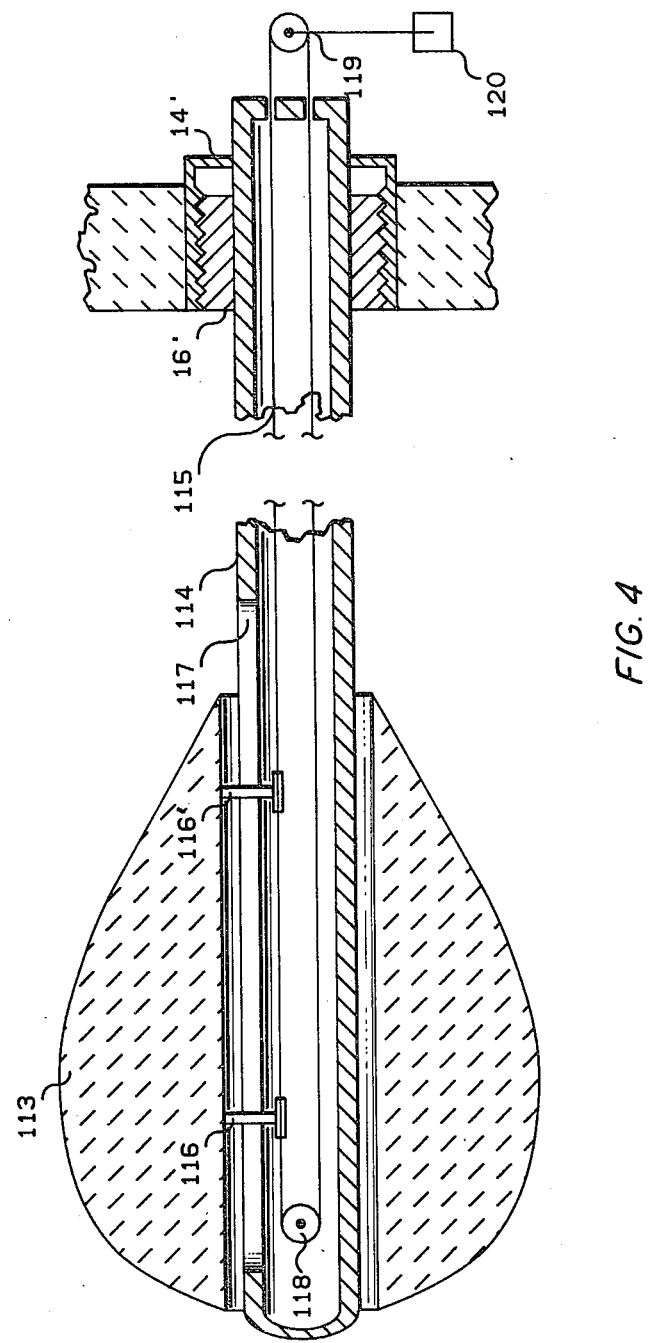
FIG. 4 is a cut-away view of a shaft and choke having internal reciprocation means.

In a further embodiment, as schematically illustrated in FIG. 4, the chokes 11 and 113 can be reciprocated or oscillated on axial shafts 12 and 114, respectively by means within the shaft. (This movement is described with respect to FIG. 3.) One non-limiting method of moving the choke on its shaft uses cable means on pulleys. Referring to FIG. 4, choke means 113 is mounted movably on shaft 114 which has cable means 115 therein. Choke 113 is affixed to cable 115, by means of 116, 116'. Slot 117 in shaft 114 affords longitudinal movement of means 116, 116' which cause movement of choke 113 axially of shaft 114. Cable 115 passes around idler pulley 118 and around drive pulley 119 actuated by drive means 120. This is a conventional drive means, e.g., to effect oscillatory motion, it can be a motor driven eccentric means or merely a crank means when only a minor amount of reciprocation of the choke is desired. Shaft 114, in this embodiment, can also be cooled, e.g., water cooled.

The shafts 12 and 114, and the choke 11, 113 can be cooled, e.g. by water entering at 30 and exiting at 31 of hollow shaft 12 of FIG. 1. For example, water can enter via 30 into central conduit 32 within conduit 12, and exit the end of the central conduit 32 in the choke 11 into the annulus 33 formed between this central conduit and the external shell 34 of the choke 11 and shaft 12, the used water or cooling fluid exiting at 31.

The apparatus of this invention in its preferred embodiment is that illustrated in FIG. 3 of the drawing and in the calculated example which follows. A reactor in accordance therewith can be constructed as described in U.S. Pat. No. 3,867,100 such that the reactant mass is formed in the combustion section 104 which will be 24 inches in diameter and 12 inches long. It will be adapted with 8 inch diameter precombustion tunnels 106. The reaction section 103 will have a diameter of 12 inches and will be about 5 feet long. A Venturi 102 will be positioned therein, its upstream edge coinciding with the downstream wall or face of the combustion section 104. The Venturi will be composed of two sections whose converging surface will slope inwardly towards an interposed throat, over a distance of about 11 inches at a total angle of about 30°. The interposed throat will be 0 inches in length and will have a diameter of 6 inches. The diverging surface will slope outwardly at a total angle of about 10° over a distance of about 34 inches.

Positioned centrally so as to extend into the converging section of the Venturi will be positioned a teardrop choke 113, comparable to that of the configuration of FIG. 1. It will have a major axis of 9 inches and a minor axis of 4 inches. The position of the choke, as measured from the upstream end of the teardrop choke 113 varies longitudinally in a cyclic manner from about flush with the downstream face of section 104 to about half the length of section 104 downstream from the downstream face of section 104.

With a reactor so described, carbon black of low or negative tint residual can be produced by reciprocating the choke within the Venturi section of the reactor (to produce broad ranges of aggregate and of nodule sizes).

Additional information relating tint residue or tint residual to aggregate size distribution and nodule size distribution is detailed in *Rubber Chemistry and Technology*, Volume 48, Number 4, September-October, 1975, pages 538 through 547. This above-referred-to publication is incorporated herein by reference. It will be evident from the foregoing that varies modifications can be made to the method of this invention. Such modifications are considered, however, to be within the scope of the invention.

| Typical Operation (Calculated for FIGS. 3, 5, and 6) | |
|---|---|
| Flow Rates: | |
| (108) Tangential Air (Total), SCF/hr | 210,000 |
| Temperature °F. | 600 |
| (107) Tangential Fuel (Total) (CH4), SCF/hr | 11,870 |
| Temperature, °F. | 120 |
| (109) Axial Oil, gallons/hr (flush) | 365 (a) |
| Temperature, °F. | 425 |
| Quench Water, gallons/hr | 90 |
| Temperature, °F. | 100 |
| Pounds N330 Carbon Black/hr | 1,925 |
| Reactor Dimensions: | |
| (104) Precombustion Zone (PCZ): | |
| Diameter, inches | 24 |
| Length, inches | 12 |
| (103) Reaction Zone: | |
| Diameter, inches | 12 |
| Length, inches | 60 (b) |
| (102) Venturi Zone: | |
| Inlet Diameter, inches | 12 |
| Converging Section Length, inches | 11 |
| Throat Diameter, inches | 6 |
| Outlet Diameter, inches | 12 |
| Diverging Section Length, inches | 34 |
| (a) Flush with upstream face of PCZ. | |
| (b) From downstream face of PCZ to quench injection. | |
| (113) Choke (Teardrop) Lengths (see FIG. 5): | |
| (C + E), Major Axis, inches | 9 |
| (D), Largest Minor Axis, inches | 4 |
| Cycle time, seconds | 5 (a) |
| Length of stroke, inches | 2 (b) |

(a) The cycle time can be in the preferable range of about 0.1 to about 10 seconds.
(b) The longitudinal cycle length of movement of the choke can range from about 1 inch to about 10 inches, and the nose end of A can be positioned on the start of the cycle even upstream of the entrance to the converging zone of the Venturi, e.g., up to 4 inches upstream. The start position can be within the converging zone of the Venturi e.g., up to 4 inches into this zone, in this size of apparatus. These specific dimensions will vary with the different size chokes and Venturis employed, as can be readily understood by those skilled in this art.

The numerals used in FIG. 3 are also used in FIGS. 5 and 6. FIG. 5 has tangential air 108 and tangential fuel combustion gases entering the precombustion zone 104 tangentially. The tunnels 106 (only one is shown) are about 10 inches in diameter. Precombustion zone 104 is 24 inches in diameter by 12 inches in length. Feedstock enters the nozzle assembly at 109 and oil spray enters precombustion zone 104. The oil feed nozzle outlet end can be flush with the upstream face of precombustion zone 104 or can be positioned within the precombustion zone 104 up to about one-half the length of precombustion zone 104. Venturi 102 has a converging zone inlet diameter of 12 inches and a length of 11 inches, converging at a total angle of about 30 degrees. The Venturi cylindrical throat is 6 inches in diameter, and in this illustration 2 inches in length. The diverging zone of the Venturi 102 has an outlet diameter of 12 inches (enters the cylindrical reactor 103 which is also 12 inches in diameter). The diverging total angle is about 10 degrees.

Referring also to FIG. 6, along with FIG. 5, the major axis of the teardrop choke is 9 inches and the maxmum minor axis is 4 inches. The larger end A of the teardrop choke is a hemisphere of 2 inch radius and the smaller end B is a hemisphere of one-half inch radius. The conical center section is 6.5 inches in length. The larger base of the conical center section is 4 inches in diameter and the smaller base is 1 inch in diameter. In operation, the teardrop choke is oscillated along its longitudinal axis, as, for example, with its larger end oscillating from adjacent the Venturi inlet to, for example, 2 inches downstream from the Venturi inlet, changing the pattern of the angular opening between the converging zone of the Venturi and the teardrop choke, resulting in the production of a broad range of aggregates (DBP) and nodules (CTAB). This oscillation cycle, e.g., is 5 seconds. The operation will produce low or negative tint residual carbon black, as desired.

I claim:

1. A method for producing negative tint residual carbon black comprising
   (1) introducing carbon black reactants under carbon black producing conditions into a carbon black reactor said carbon black reactor comprising:
      (a) a mixing section with conduit means for the introduction of reactants;
      (b) a reaction section positioned downstream of the mixing section and in open communication therewith;
      (c) a choke positioned within said reactor; and
      (d) means for producing reciprocating movement of said choke along the longitudinal axis of said reactor during operation of said reactor; and
   (2) reciprocating said choke while producing carbon black said reciprocation sufficient to disrupt flow of reactants.

2. A method of claim 1 wherein said reactor comprises a Venturi section and said choke is positioned on one side of the Venturi throat.

3. A method of claim 1 or 2 wherein said means for producing reciprocating movement comprises a shaft within said reactor attached to said choke and extending through said reactor to the outside of the reactor.

4. A method of claim 1 or 2 wherein said choke comprises heat exchange means.

5. A method of claim 3 wherein said choke and shaft comprise heat exchange means.

6. A method of claim 3 wherein said shaft comprises means for reciprocation located internally in the shaft.

7. A method of claim 5 wherein said shaft comprises means for reciprocation located internally in the shaft.

8. A method of claim 1 or 2 in which the length of the major axis of said choke is within the range of from about two to about ten times the length of the minor axis of said choke.

9. A method of claim 1 or 2 in which the choke has a length within the range of from about one to about three times the diameter of the reaction section.

10. A method of claim 1 or 2 in which the choke has a minor axis within the range of from about one-third to about four-fifths of the diameter of said reaction section.

* * * * *